Oct. 16, 1956 G. H. RIDINGS ET AL 2,767,242

TWO-WAY FACSIMILE TELEGRAPH SYSTEMS

Filed July 24, 1951 5 Sheets-Sheet 1

FIG. I

INVENTORS
G. H. RIDINGS
R. J. WISE

BY

ATTORNEY

TWO-WAY FACSIMILE TELEGRAPH SYSTEMS

Filed July 24, 1951 5 Sheets-Sheet 2

INVENTORS
G. H. RIDINGS
R. J. WISE
BY
A. H. Thomas
ATTORNEY

Oct. 16, 1956 G. H. RIDINGS ET AL 2,767,242

TWO-WAY FACSIMILE TELEGRAPH SYSTEMS

Filed July 24, 1951 5 Sheets-Sheet 3

INVENTORS
G. H. RIDINGS
R. J. WISE
BY
A. A. Thomas
ATTORNEY

Oct. 16, 1956 G. H. RIDINGS ET AL 2,767,242

TWO-WAY FACSIMILE TELEGRAPH SYSTEMS

Filed July 24, 1951 5 Sheets-Sheet 4

INVENTORS
G. H. RIDINGS
R. J. WISE

BY A. A. Thomas
ATTORNEY

Oct. 16, 1956 G. H. RIDINGS ET AL 2,767,242

TWO-WAY FACSIMILE TELEGRAPH SYSTEMS

Filed July 24, 1951 5 Sheets-Sheet 5

INVENTORS
G. H. RIDINGS
R. J. WISE

BY A. A. Thomas
ATTORNEY 2,767,242

TWO-WAY FACSIMILE TELEGRAPH SYSTEMS

Garvice H. Ridings, Summit, and Raleigh J. Wise, Arlington, N. J., assignors to The Western Union Telegraph Company, New York, N. Y., a corporation of New York Application July 24, 1951, Serial No. 238,338

7 Claims. (Cl. 178—6.6)

Figure 1:
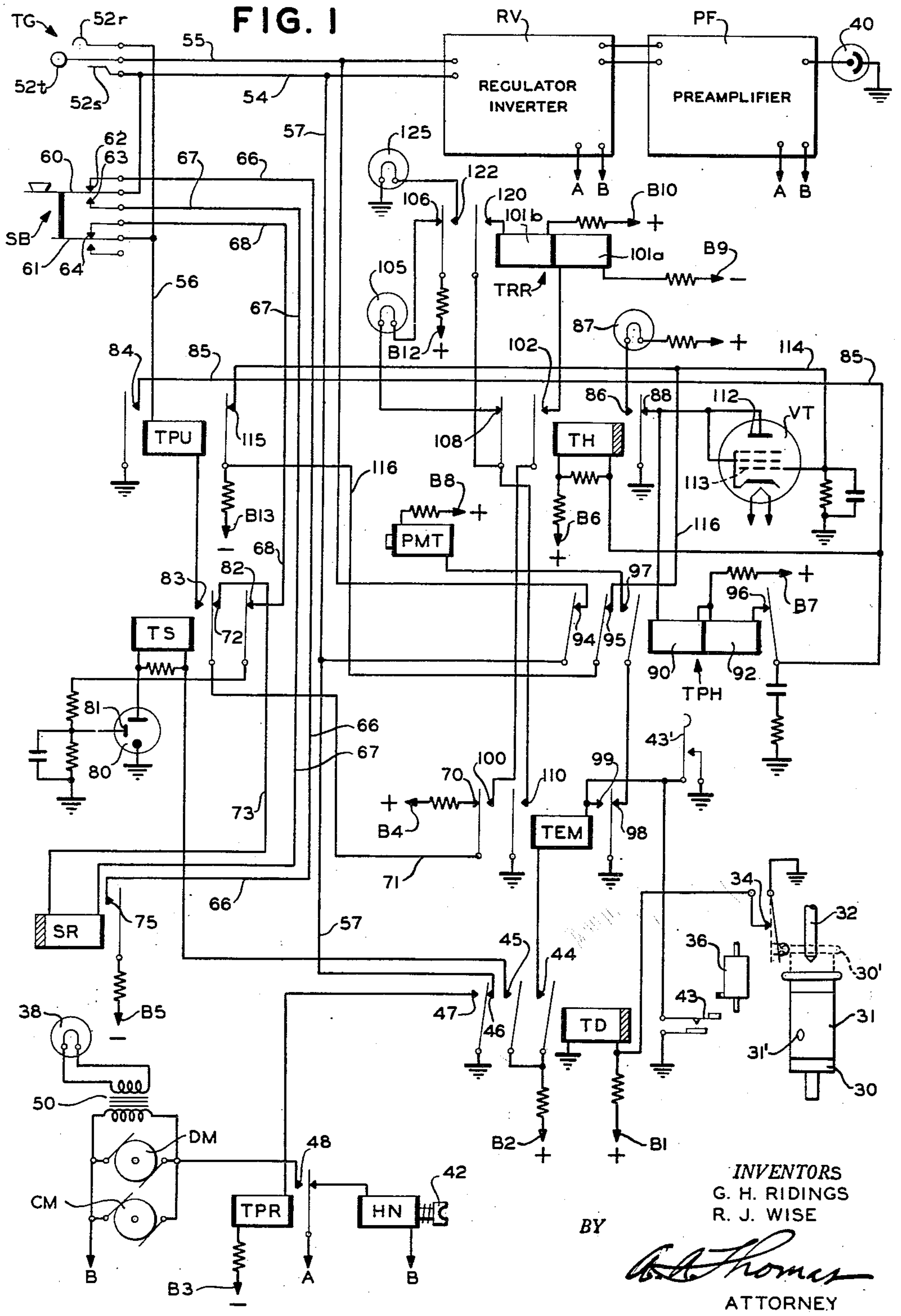

This invention relates to the art of facsimile telegraph communication and its object is to provide a system in which a main telegraph office serves a number of patrons or subscribers at out-stations for the speedy delivery and pickup of messages by facsimile to and from the patrons. The present system involves certain novel features of automatic control and safety provisions for improving the practical operation of the system in a way to meet commercial requirements.

The equipment of our system requires two sets of facsimile machines at the main office, namely, a set of transmitters for sending out messages and a set of recorders for receiving messages. Each patron or subscriber has a transceiver, which is a small unit that can be placed on a desk or table in an office. These transceivers have each a pair of lines which go to a concentrator at the main office where the operator can plug in any patron's machine, either to receive a message from him or to send him a message for recording on his machine.

The patron's transceiver has a setting-up switch with inter-locking push buttons, only one of which can be in operated position at a time. The transmitting of a message on this machine is done by optical scanning and a received message is recorded by an electric stylus. To send a message to the main office, a patron has only to push the send button after placing the telegram on the drum of his machine. The operation of that button automatically lights the patron's call lamp at the main office where the operator plugs a recorder into the patron's jack and presses a start button. The rest of the operation is automatic until the complete message has been recorded, whereupon the patron's machine automatically shuts down.

The main office operator, after reading the recorded message puts a special acknowledge signal (either coded or one of a particular frequency) on the patron's line to let him know that his message has been received correctly. This signal may take the form of dots and dashes sounded by a buzzer, or it may be a lamp which lights when the acknowledge frequency is sent over the line after the patron's machine has shut down. The patron is thus assured that his telegram has been accepted by the main office for forwarding to its destination.

When the main office has a message for a patron, the operator plugs a transmitter into the patron's jack and presses a start button. If the patron's machine has not been turned on as a transmitter, his buzzer will sound as a signal that the main office wants to transmit a message. After loading his drum with a recording blank, the patron need only press the receive button, whereupon the machine is automatically placed in condition to record the coming-in message.

At the close of a message sent by the main office transmitter, the patron's buzzer sounds and his machine will stop automatically when the drum completes its stroke. In the case of a short message, the patron can shut down the machine by pressing a stop button, which also disconnects the buzzer. The patron now removes the message and if the reading is satisfactory, he operates an acknowledge button which lights the signal at the main office where the operator can now unplug the patron's line. On the other hand, should the patron find the received message not satisfactory (for example, not clearly legible), he operates a repeat or rerun button and this automatically causes the main office transmitter to run the message over again.

An important safety provision in our system comprises means for automatically informing the central operator of a sudden failure of the patron's machine during a transmission from the main office. If the patron's drum should stop rotating for any reason before the conclusion of a message, a vacuum tube in the main office equipment is automatically operated to stop the transmitter drum. This notifies the central operator that something has gone wrong at the patron's machine and she will contact the patron to determine the cause.

The novel control circuits of this system are so designed that the interlocking push buttons on the patron's machine must be operated correctly. That is, the send button and not the receive button must be pressed for transmission, and the other way around. If the wrong button is pressed, the patron's call will not be placed at the main office and the buzzer will sound to advise him of the mistake. Not until the correct button is operated, whether for sending or receiving, will this machine be connected with the machine office.

The construction and operation of our two-way facsimile system will be fully understood from a description of the accompanying drawings in which—

Figure 2:
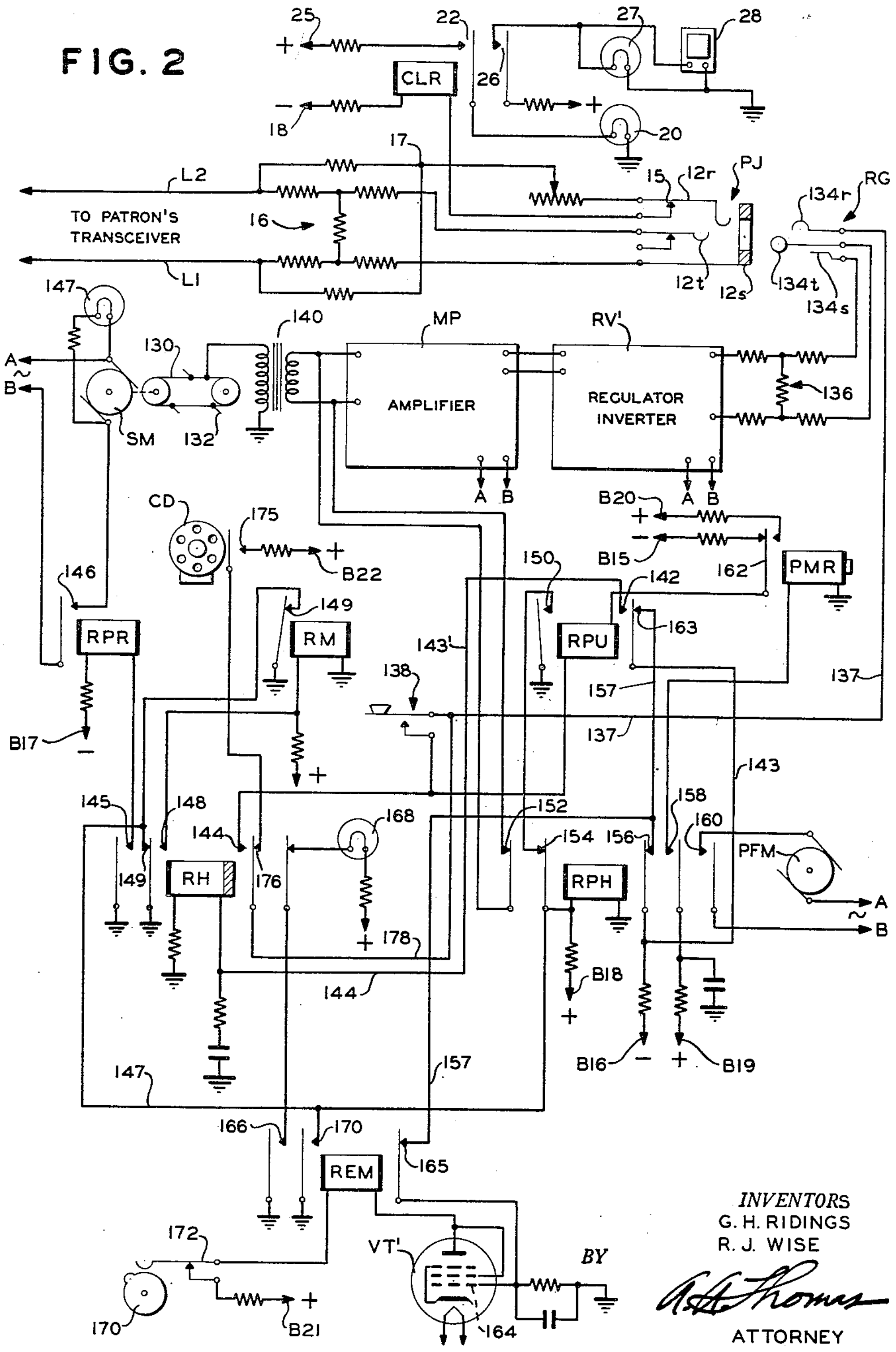
Figures 3, 5:
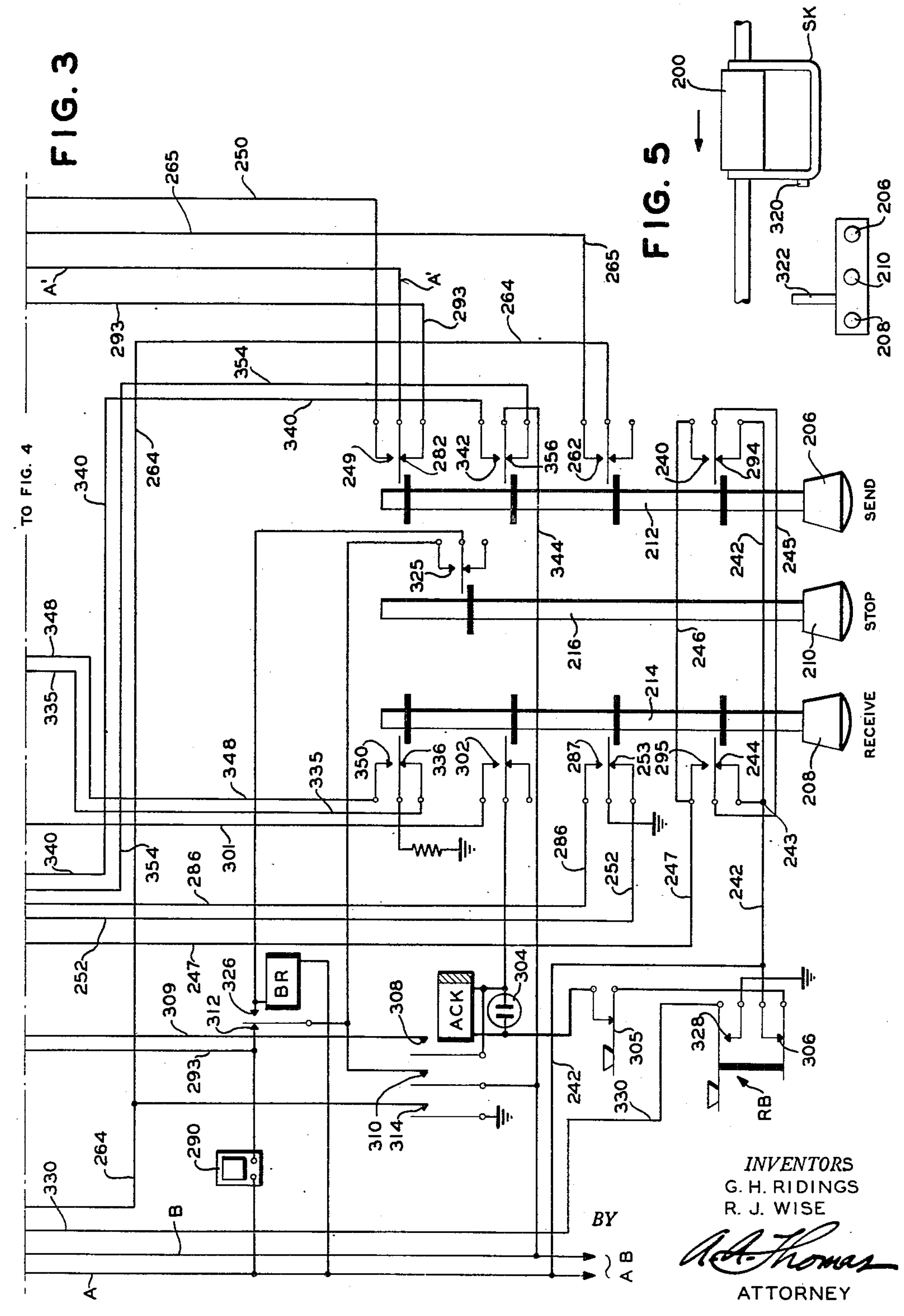
Figure 4:
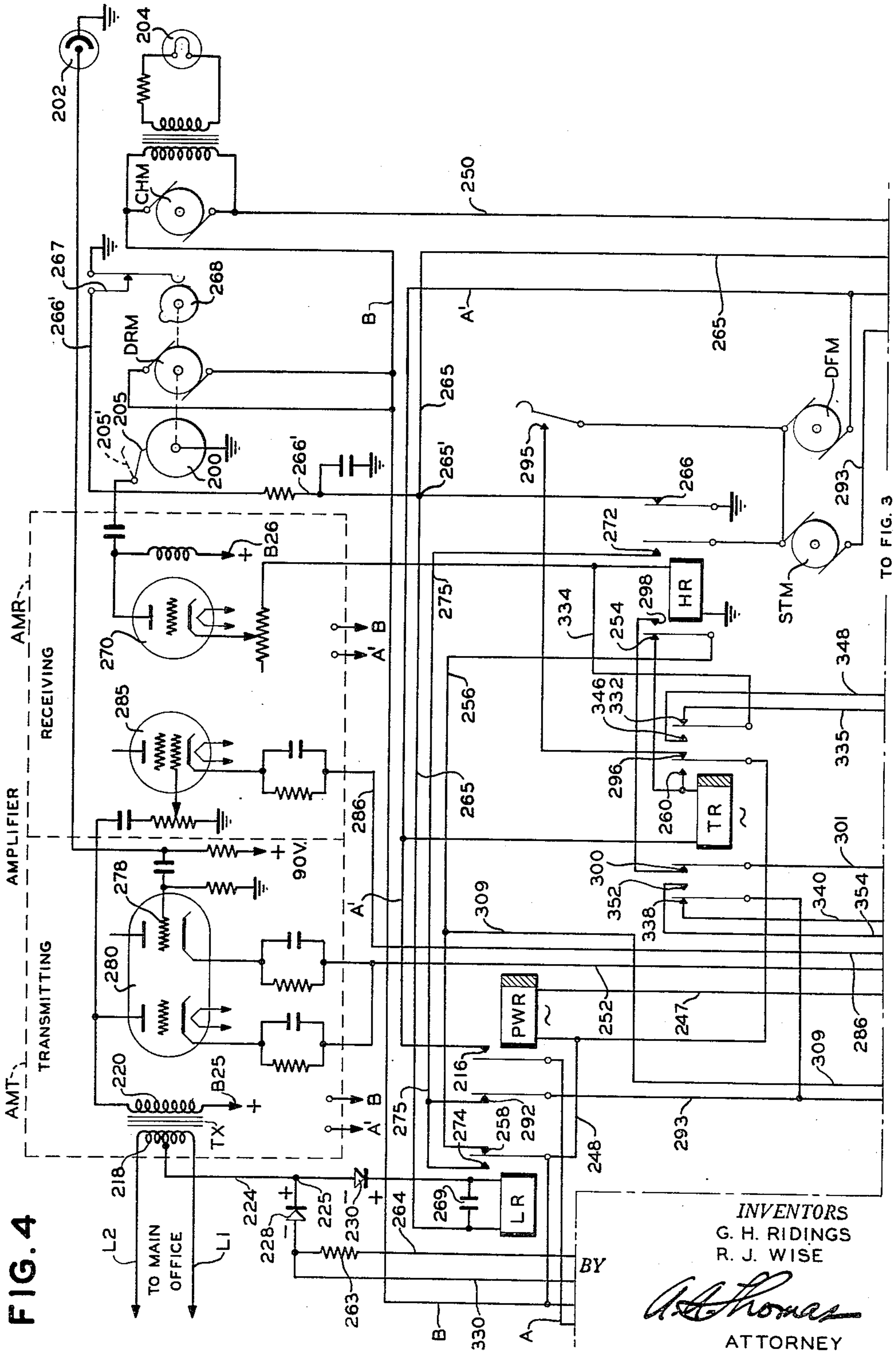
Figure 6:
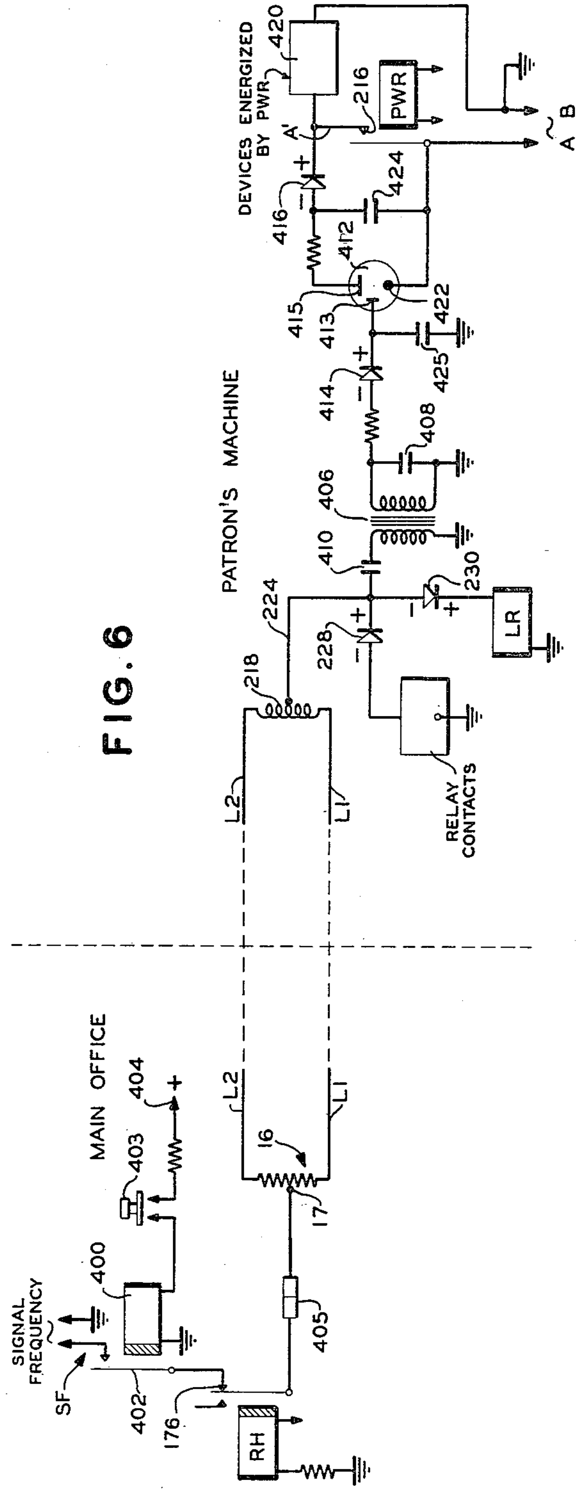
Figure 7:
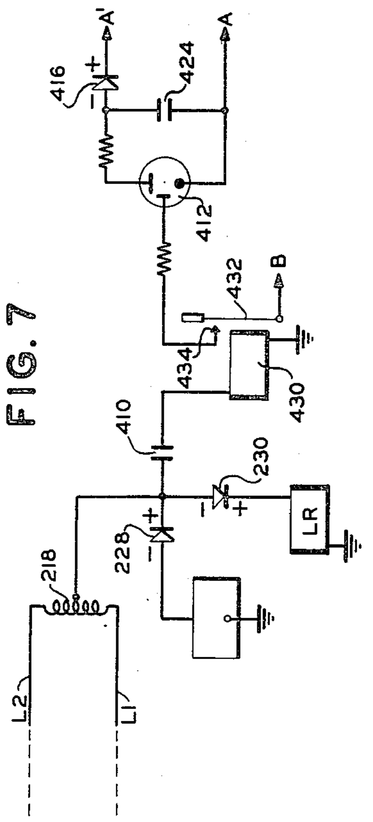

Fig. 1 shows the transmitter equipment at the central office in schematic form;

Fig. 2 similarly shows the recorder equipment at the main office;

Figs. 3 and 4 together show the electrical equipment in the patron's transceiver for transmitting and recording;

Fig. 5 illustrates certain details in connection with the setting up switches; and Figs. 6 and 7 show certain signal circuits between the main office and each patron's machine; Fig. 7 being a modification of Fig. 6.

In the circuit diagrams as presented in the drawings, we have indicated the source of power for the machines at each end of the system by the letters A and B, which may be assumed to represent a pair of bus bars or terminals connected to a local power line. For the battery potentials energized in the simplex control circuits, we use plus and minus signals wherever necessary to indicate, respectively, a source of positive and negative potential.

*Transmitter equipment at main office (Fig. 1)*

The main office is provided with a panel of line jacks and calling lamps for the patron's machines, there being a jack and lamp assembly for each machine. For this discussion, it is sufficient to show only one patron's line circuit L1—L2, which terminates in a jack PJ (Fig. 2). In other words, each jack identifies a particular patron's machine. The central office has a sufficient number of transmitters and recorders to handle expeditiously the business of sending and receiving telegrams. Each transmitter has a plug TG (Fig. 1) and each recorder has a plug RG (Fig. 2). For easy distinction, we make the transmitter plugs red and the recorder plugs black. When a message is to be sent to a patron, a transmitter plug TG is inserted into his jack, and in answer to a patron's call his line jack is connected to a main office recorder by a receiver plug RG.

Each patron's jack PJ has three contacts, a sleeve 12*s*, a tip 12*t*, and a ring 12*r*, which is normally closed against a fixed contact 15, called the ring normal. The sleeve 12s and tip 12t are connected through an H-pad 16 to the transmission pair L1—L2, and the ring 12r goes to the central point 17 of the pad through appropriate resistors. The ring 12r thus connects both wires L1—L2 through paths of equal resistance for the simplex control circuits of the system. These D. C. battery circuits do not interfere with the A. C. signals going simultaneously over the same lines.

A line relay CLR (there is one for each patron's line) is connected at one side to a source of negative battery 18 and the other side of the relay goes to the ring normal 15. Therefore, when the jack contacts 12r—15 are closed (their normal condition) negative potential is placed on both lines L1—L2 through the relay CLR. When this relay is energized in response to a call from the patron, the call lamp 20 placed over the jack PJ is connected by the closed relay contacts 22 with a battery terminal 25, so that the lamp lights up and tells the operator that the patron wants to send a message. The relay CLR may also be provided with contacts 26, which are closed to operate a large bright lamp 27 and a buzzer 28 as extra signals common to all the subscribers for attracting the main office operator's attention to the jack panel when any subscriber puts in a call.

It should be understood that the equipment at the central office described in the two preceding paragraphs, although shown only in connection with the recorder circuits in Fig. 2, also applies to the transmitter circuits of Fig. 1, which we shall now describe.

In the broad aspect of our invention, the machine associated with the transmitter circuits at the main office may be of any approved construction, but for the purposes of this description we have selected a machine like that disclosed in the pending application of John H. Hackenberg, Serial No. 122,326, filed October 19, 1949. In Fig. 1, we have shown in a schematic way only such parts of the Hackenberg transmitter as are necessary to explain the operation of the circuits.

Briefly stated, the transmitter of the Hackenberg application is of the optical scanning type in which a drum 30 carrying a message sheet 31 is removably mounted in vertical position between a pair of centers, of which only the top center 32 is shown. The drum 30 is inserted in the machine by pushing the top center 32 upward and the lower center supports the drum in scanning position, as indicated by the dotted outline 30'. In this position, the drum closes a normally open switch 34, which is connected to a plus battery terminal B1 in shunt to a relay TD. When there is no drum in the machine, the switch 34 is open and the relay TD is energized. The insertion of a drum in the machine automatically closes the switch 34 which puts ground on pattery B1 and releases the relay TD. This relay is slow to release, so that a mere momentary closing of the shorting-out switch 34 during the insertion or removal of the drum will not cause the relay TD to release.

The optical scanning mechanism associated with the message drum 30 is represented schematically in Fig. 1 by a slidable frame or carriage 36 on which are mounted an exciter lamp 38, a photocell 40, a motor CM for operating a light chopper or interrupter disk (not shown), and a half-nut 42 for connecting the carriage to a screw shaft (not shown) driven by a motor DM, which also rotates the drum 30. The half-nut 42 is normally pressed by a spring against the screw shaft and is held out of operative position by a magnet HN which is maintained in energized condition from the power lines A—B when the machine is not transmitting.

Those familiar with optical facsimile scanning will understand that light from the exciter lamp 38 is focused through a condenser lens tube as a bright spot on the message sheet and from there the light is reflected through a pickup lens tube to the photocell 40, which converts the interrupted beam into corresponding electrical signals that pass through a pre-amplifier PF and a regulator inverter RV before going over the transmission line L1—L2. The units PF and RV are well-known devices in facsimile systems and require no description.

During a scanning operation, the carriage 36 moves slowly down to shift the scanning spot along the message sheet on the rapidly rotating drum 30. At the end of its travel the carriage closes a switch 43 which is in shunt to a normally open wire contactor 43' arranged to engage the metal drum 30 through a hole 31' punched in the message sheet after the signature on a message. As will be explained later, the closing of the contactor switch 43' stops the machine before the carriage 36 completes its full downward stroke.

It should be explained at this point that the driving connections from the motor DM to the drum 30 and the scanning carriage 36 contain a clutch which is operated by a phase magnet PMT when the latter is energized. That is to say, although the motor DM starts to operate when a drum is placed in the machine, the drum will not rotate and the scanning carriage will not move until the phasing magnet is energized. How the magnet releases the phasing clutch is fully shown and described in the aforesaid Hackenberg application.

When the operator inserts a loaded drum in the machine, the energized relay TD releases and connects its contacts 44 and 45 to plus battery B2, opens the contact 46 and puts ground on contact 47, which goes to one side of a relay TPR. This relay is thus energized from negative battery B3 and closes its contact 48 with the following result: The magnet HN is deenergized and releases the half-nut 42 into driving engagement with the screw shaft that operates the scanning carriage. At the same time the power lines A—B are closed through the drum motor DM, the chopper motor CM and the transformer 50 which feeds the exciter lamp 38. In other words, the mere insertion of a drum into the transmitter energizes the optical scanning mechanism, although the scanning operation will not start until the machine has been phased, as will be explained in due course.

The plug TG of each transmitter at the main office consists of a sleeve contact 52s, a ring contact 52r and a tip contact 52t. The contacts 52s and 52t are connected to the output lines 54—55 of the regulator inverter RV, and the ring contact 52r is connected by a wire 56 to one side of a relay TPU. The output line 54 is connected by a wire 57 to the normally grounded contact 46 of relay TD so as to keep the sleeve 52s of the transmitter plug grounded for safety.

Each transmitter has a start button SB which comprises two movable spring arms 60 and 61, insulated from each other, and three stationary contacts 62—63—64. The switch arm 60 is connected to the sleeve contact 52s, and the other switch arm 61 is connected to wire 56 which goes to the ring contact 52r. The contacts 62, 63 and 64 are connected respectively to wires 66, 67 and 68. In the normal position of button SB, the spring arms close their associated contacts 62 and 64.

When the start button SB is pressed, the switch arm 60 connects the sleeve contact 52s of the transmitter plug TG with wire 67, which goes to one side of a slow-release relay SR, whereby positive potential is applied to contact 52s through the following circuit: From positive battery B4 through the back contact 70 of a relay TEM, by wire 71 through the back contact 72 of a relay TS, by wire 73 through the winding of relay SR, and by wire 67 through contacts 63 and 60 of the start button to the sleeve contact 52s.

When the button SB is released, the battery circuit through relay SR is opened, whereby the positive potential is removed from the sleeve contact 52s, but the relay does not let go immediately because it is of the slow-release type. Therefore, the continued energized condition of relay SR upon the release of the start button puts a high negative potential (in this case 110 volts) on the sleeve contact 52s through the following circuit: From the negative battery B5, through closed relay contact 75, wire 66, and through the closed button contacts 60 and 62 to the sleeve contact 52s of the transmitter plug TG.

The high negative potential thus placed on the sleeve contact 52s will cause the energizing of relay TS by means of a cold cathode tube 80 through which the relay circuit is closed. We shall assume here that the full negative potential from battery B5 appears on the sleeve contact 52s when the start button SB is released. This potential is impressed on the starting electrode 81 of tube 80 from the ring contact 52r (when the plug TG is connected to the patron's line), through button contacts 61 and 64, and by wire 68 through the closed back contact 82 of relay TS. This makes the tube 80 conductive and closes the circuit of relay TS from plus battery B2 and the closed contact 45 of relay TD (now in deenergized condition). The relay TS remains energized until the end of transmission.

When the relay TS operates, the opening of contact 82 takes the starting voltage off the electrode 81 of tube 80 which, once started, remains conductive. The opening of back contact 72 and the closing of front contact 83 transfers the positive potential from B4 through relay TPU which will start pulsing if the patron's machine has been turned on as a receiver. It may be noted here, that during transmission the positive potential remains on the line and the relay TPU continues to pulse.

The first pulse that energizes the relay TPU closes its front contact 84 and this energizes a relay TH from battery B6 through a wire 85. The closed contact 86 of relay TH, which stays on during transmission, lights a signal lamp 87 and the opened back contact 88 breaks the circuit of the energizing coil 90 of a double-coil relay TPH. But this relay, which is normally held in energized condition by coil 90, is now held energized through its locking coil 92 from battery B7 through wire 85 and the closed front contact 84 of the pulsing relay TPU until the next interruption of the pulsing circuit.

When the pulsing relay TPU releases, its opened contact 84 breaks the circuit of the locking coil 92 of relay TPH, which now releases for the first time and opens its front contacts 94, 95 and 96. The closing of the back contact 97 of relay TPH energizes the phase magnet PMT from battery B8 through the closed grounded contact 98 of relay TEM (not energized). As previously mentioned, the operation of magnet PMT, which remains energized during the entire transmission period, causes the motor DM to rotate the drum 30 and feed the scanning carriage 36 slowly along the drum. When the carriage reaches the end of its forward travel, it closes the switch 43 whereby the relay TEM (called the end-of-message relay) is energized from battery B2 through the closed contact 44 of the released relay TD.

The opened contact 98 of the energized relay TEM breaks the circuit of magnet PMT, whereby the drum 30 and the carriage 36 are disconnected from the motor DM, so that the drum stops and the carriage is pulled back to initial position. The opening of switch 43 by the return of carriage 36 has no effect on relay TEM which locks through its closed contact 99.

When the energized relay TEM opens its back contact 70 and closes its front contact 100, it removes the positive potential kept on the line during transmission by the battery B4 and applies negative potential from the negative battery terminal B9 to the line through a double coil relay TRR. This relay has one coil 101a connected to negative battery B9 and a second coil 101b connected to positive battery B10.

The negative circuit from B9 goes through coil 101a, the closed contact 102 of energized relay TH, the closed contact 100 of energized relay TEM, over wire 71 to the closed front contact 83 of the energized relay TS, through the winding of relay TPU, and through the ring contact 52r of the inserted plug TG over the line to the connected receiver. At this time, the negative current through coil 101a of relay TRR is not sufficient to operate that relay.

The effect of the negative potential on the patron's machine will be explained in the description of Figs. 3 and 4, but we can point out here that one result of that negative potential is to produce an end-of-message signal for the patron who then presses an acknowledge button. That will release the relay TPU which in turn releases the relay TH and lights a lamp 105 (called the acknowledge lamp) from battery B12. The circuit of this lamp goes through the back contact 106 of relay TRR (not operated), the back contact 108 of the released relay TH, and the closed contact 110 of the energized relay TEM. The operator now removes the drum from the transmitter and pulls out the plug TG, thus restoring the equipment to its normal standby condition.

The coil 90 of relay TPH is associated with a vacuum tube VT, shown here as a pentode with its plate 112 connected to one side of coil 90 and its control grid 113 connected by a wire 114 to the back contact 115 of relay TPU. When this relay is deenergized, the control grid 113 is connected to a source of negative battery B13, which keeps the tube from firing. A second path for this negative grid bias goes by a wire 116 through the closed contact 95 of the energized relay TPH. As we have seen, this relay is normally kept energized by its coil 90, whose circuit goes through the normally closed contact 88 of relay TH before the latter is energized.

The function of tube VT is twofold in that it provides a circuit through coil 90 after the close of transmission and also if the patron's machine should stop before transmission is completed. To understand this let us remember that the relay TPU continues to pulse during the entire transmission period and this pulsing (as will be seen later) is due to the operation of the patron's scanning drum. In other words, the pulsing of relay TPU means that the patron's machine is operating properly to record the transmitted message.

Let it be noted that for each revolution of the patron's drum, the circuit of relay TPU is interrupted briefly (for a fraction of a second) and stays closed for the rest of each revolution. The contact 115 is therefore closed for brief intervals that keep sufficient negative potential on the grid of tube VT to prevent the latter from operating. This holds the relay TPH in an unenergized condition, as is necessary for the continued operation of the transmitter.

When the patron's drum stops rotating (whether after or during transmission), the relay TPU stops pulsing and remains energized steadily, thereby keeping its contact 115 open and allowing the tube VT to fire. The coil 90 of TPH is thus energized and opens its contact 97. This releases the phase magnet PMT, thereby stopping the transmitter drum 30 and releasing the carriage 36. If this event occurs during a transmission cycle (that is, before the message is completely scanned), the main office operator knows that the patron's drum has stopped turning and that something is wrong with his machine or with the line. The operator will now contact the patron to determine the cause of the disorder or the transmission of the message may be started anew. It can be said, then, that the relay TPU, the vacuum tube VT, and the relay TPH cooperate to serve as an indicator of the operative condition of the patron's machine during a transmission from the main office.

We have previously pointed out that when the relay TEM is energized at the close of a transmission, negative potential is placed on the line from B9 through the coil 101a of relay TRR, the closed contact 102 of relay TH (still energized), the closed contact 100 of relay TEM, the closed contact 83 of the energized relay TS, and through the winding of relay TPU. The circuit of this negative potential includes a high resistor at the patron's machine, so that the relay TRR will not operate. If the patron, after inspecting the received message, is satisfied with it, he presses his acknowledge button and that will light the main office lamp 105 because the relay TH has released and the relay TEM is energized.

Let us suppose that the patron is not satisfied with the recorded message and desires a rerun. In that case, he presses a different button (called the rerun button) and that will cut out the resistor in the negative circuit of coil 101*a* of relay TRR, thereby causing the increased current to operate that relay. The closed contact 120 locks the relay TRR through its other coil 101*b* and the closed contact 110 of energized relay TEM. The closed contact 122 of relay TRR completes the circuit of a lamp 125 which is a signal to the main office operator that the patron was not satisfied with the message and is making a rerun. The operation of lamp 125 keeps the acknowledge lamp 105 out of circuit. We are to remember, then, that the relay TRR is energized only when the patron desires a second recording of the message.

Reviewing briefly the functions of the nine relays in the equipment of the main office transmitter in Fig. 1, we have the following particulars:

The two relays TD and TPH are normally energized. That is, they are kept in that condition when the transmitter is not working. This fact is indicated in Fig. 1 by the operated position of the relay contacts. The closed contact 46 of relay TD keeps the sleeve 52*s* of plug TG grounded, and the closed contact 94 of relay TPH keeps the output wires 54—55 short-circuited to prevent any signals from going over the system except during a transmission period. The relay TD is automatically released when the operator inserts a drum in the machine.

The relay TPR is energized upon the release of relay TD to turn on the power for the drum motor DM, the chopper motor CM and the exciter lamp 38. The energized relay TPR also releases the magnet HN so that the half-nut 42 moves into engagement with the screw shaft that feeds the optical scanning carriage 36.

The relay SR is momentarily energized when the start button SB is depressed after insertion of the plug TG whereby positive battery is applied to the sleeve 52*s* of the plug from B4.

The relay TS is energized through the tube 80 upon release of the start button SB and remains energized until the end of transmission.

The pulsing relay TPU is energized from battery B4 when the relay TS pulls up and closes its contact 83 and relay TPU continues to pulse while the transmission goes on.

The relay TH is operated by the first energizing pulse of relay TPU and stays on during transmission.

The normally energized relay TPH lets go upon the first release of the pulsing relay TPU after the energizing of relay TH.

The release of relay TPH energizes the phase magnet PMT which starts the rotation of drum 30 and the feeding of carriage 36. The relay TPH remains deenergized during transmission.

The relay TEM is first energized at the close of a transmission when the carriage reaches the end of its travel or when the contactor 43' enters the hole 31' in the sheet. The function of relay TEM is to change the simplex potential on the line from positive to negative.

The ninth relay TRR operates only when the patron desires a rerun of the message.

Let it be noted that the four relays TPR, TS, TPU and TH remain energized during the entire transmission period.

*Recorder equipment at main office (Fig. 2)*

In the present commercial embodiment of our system, the type of recorder used at the main office is like that disclosed in the pending application of Hallden and Zabriskie Serial No. 83,333, filed March 25, 1949. For the purposes of this description, we need only point out that the recording mechanism of the Hallden and Zabriskie machine comprises an endless metal belt 130 driven at high speed by a synchronous motor SM and carrying a plurality of styluses 132 (in this case three) which travel in a straight path across a flat recording blank that is fed slowly upward on a platen (not shown) by a motor PFM. Any other practical kind of recorder may be used, provided it meets the requirements of the system.

As previously mentioned, each recorder at the main office has its own plug RG for connecting it to a calling patron's line jack PJ. The recorder plugs have each a ring contact 134*r*, a sleeve contact 134*s* and a tip contact 134*t*. The contacts 134*s* and 134*t* are permanently connected to the signal input terminals of a regulator inverter RV' through an H-pad 136, and the ring contact 134*r* is connected by a wire 137 to a start button 138. The output of the regulator inverter RV' goes to the input terminals of amplifier MP, whose signal output is further amplified by a transformer 140 which is connected in the recorder circuit of the stylus elements 132.

When the main office operator, in response to the lighting of a patron's call lamp 20, inserts the plug RG and presses the start button 138, the negative simplex circuit grounded at the patron's machine is completed through a relay RPU from the battery terminal B15. This circuit goes through the closed start button 138 and by wire 137 to the ring contact 134*r*, which connects with the transmission lines L1—L2. The closed contact 142 of the energized relay RPU completes the circuit of a slow-release relay RH from the negative battery terminal B16 through wires 143 and 143'. When the start button 138 is released, the circuit of RPU goes through the closed contact 144 of the energized relay RH, which, being slow to release, stays energized during the pulsing of RPU.

The closed contact 145 of relay RH energizes a power relay RPR from battery terminal B17. The closed contact 146 of the power relay completes the circuit of motor SM and a red lamp 147 which tells the operator that the power is on. The closing of contact 148 of relay RH shorts out the normally energized relay RM, which thereupon releases and opens its grounded contact 149. This removes ground from wire 147 which normally shorts out a relay RPH from battery terminal B18. However, the relay RPH is not energized at this time because its winding is still shorted out by the closed contact 150 of the energized relay RPU.

We are to assume that the negative simplex circuit passing through relay RPU is interrupted in the patron's machine once for each revolution of his drum, so that this relay pulses in response to those interruptions. The first interruption reaching RPU opens the contact 150 to remove the short circuit from relay RPH, which thereupon energizes and operates all its contacts with the following results:

The opened contact 152 removes the short circuit from the output lines of amplifier MP. The opened contact 154 keeps the ground open from battery B18 so that the relay RPH is not shorted out by contact 150 when RPU is energized. The opened contact 156 disconnects the wire 157 from negative battery B16 for a purpose to be presently explained. The closed contact 158 of RPH completes the circuit from battery B19 through the phase magnet PMR which releases the stylus belt for operation by the motor SM. The closed contact 160 of RPH connects the paper feed motor PFM in the power circuit. The main office recorder is now in condition to receive the facsimile signals coming from the patron's machine.

The phase magnet PMR has a tongue 162 which normally connects the relay RPU to the negative potential source B15; but, upon the magnet being energized, the tongue switches the relay over to the plus battery terminal B20. That is to say, the energized phase magnet PMR reverses the simplex potential from negative to positive. The effect of this reversal of simplex battery on the line is to cause the patron's machine to start scanning the message, as we shall see later.

It should be noted that the relay RPU at the main office keeps pulsing during a transmission in synchronism with the patron's rotating drum. As long as the relay RPU keeps on pulsing, the periodic closing of its contact 163 keeps high negative potential on the control grid 164 of a pentode VT' to prevent the operation of the tube. This negative grid bias goes from the negative battery terminal B16 through wire 143, closed contact 163 of RPU, wire 157, and the closed contact 165 of a relay REM (not energized). The circuit of relay REM, called the end-of-message relay, goes from plus battery B21 through the tube VT' so that this relay can not operate until the tube fires.

At the close of a transmission, when the patron's drum stops, the relay RPU stops pulsing and stays energized continuously, so that its contact 163 remains open and cuts off the negative bias on grid 164, whereupon the tube VT' fires and the end-of-message relay REM is energized for the first time since the machine started. The energized relay REM breaks the grid bias contact 165 and thereby keeps the tube VT' conductive. The closed contact 166 of REM lights a lamp 168 to tell the operator that the message has been completed. When the end-of-message lamp 168 goes on, the busy lamp 147 goes out. The other closed contact 170 of REM shorts out the relay RPH, which now releases and stops the recorder.

The only relay that remains energized after the release of RPH is the end-of-passage relay REM. This relay and the lamp 168 stay on until the operator has manually fed out a definite length of paper bearing the recording message. This manual paper feed operation at the close of transmission (not to be confused with the automatic paper feed by the motor PFM during transmission) is fully explained in the previously mentioned application of Hallden and Zabriskie Serial No. 83,333. Since that feature is not a part of the present invention, it will suffice to say that when a measured length of paper has been pulled out of the machine, a cam 170 opens a switch 172 which releases the relay REM and extinguishes the light 168.

Before the operator pulls out the plug RG, she reads the telegram recorded on the length of paper torn off from the machine. If the message is clear, she will operate a code device CD to send a special signal in the form of dots and dashes to the patron's machine. As code devices of this kind are well known, we need only say that as the operator spins the dial of CD, a switch 175 is operated like a telegraph key for sending dots and dashes over a circuit from battery B22 through closed contact 176 of relay RH (now released), wire 178, and by wire 137 to the ring contact 134*r* of plug RG. From there the coded signal goes over the line L1—L2 to the patron's machine, where the signal sounds a buzzer to let him know that his message has been received correctly. The operator at the main office now pulls out the plug RG and the recorder is completely disconnected, ready for the next operation.

*The patron's transceiver equipment* (*Figs. 3–4*)

In a commercial embodiment of our facsimile system, the patron's machine we use is of the optical transceiver type, like that set forth in the pending application of Wise and others, Serial No. 224,926, filed May 7, 1951. The machine of that case has optical scanning mechanism for transmission and an electric stylus for recording. A rotary drum supports the scanned sheet for transmitting as well as recording, and a carriage feeds the drum along its shaft for either operation.

Such structural parts of the transceiver as are mentioned in this description are indicated schematically in Figs. 3 and 4 as follows:

The drum 200, on which the sheets are mounted for scanning, is rotated by a motor DRM, and the scanning carriage that feeds the rotating drum axially along its shaft is operated by a small synchronous motor DFM. The optical scanning mechanism is represented by a photocell 202, a motor CHM for operating the usual chopper disk associated with the photocell, and an exciter lamp 204 which sends the scanning beam to the sheet on the drum. The recording mechanism is indicated in Fig. 4 by a stylus 205 and a motor STM for moving the stylus to operative position and holding it there.

The patron's transceiver is provided with amplifier apparatus consisting of a transmitting section AMT and a receiving or recording section AMR. These amplifiers may be of any practical construction and we have included only such elements thereof as are needed for the circuits to be described. Only one of the amplifiers can be in operative condition at a time, as determined by a pair of setting-up switches shown in Fig. 3 by a send button 206 and a receive button 208. A third button 210 stops the machine when set up for either operation. These three buttons are so mounted and connected that only one of them can be in operated position at a time, as fully shown and described in the Wise application above mentioned.

For the present specification, it suffices to indicate the switch operating connections for the buttons 206—208—210 by simple rods 212—214—216, respectively, adapted to operate the associated switches when the buttons are pushed in. When either of the buttons 206—208 is operated, it remains locked until released by either one of the other two buttons. When the stop button 210 is operated, it returns instantly to normal position upon release. This is as much as we need to know about the interlocking buttons 206—208—210 which are to be regarded as representing any kind or form of send-receive switch mechanism suitable for the patron's machine.

The power for the patron's machine is indicated by a pair of bus bars or leads A—B which connect with a local source of power, such as the conventional 110 volt-60 cycle house lighting circuit. A third conductor A' is connected to the lead A through a contact 216 of a power relay PWR when the latter is energized. Therefore, the two pairs of amplifier terminals marked A'—B in Fig. 4 indicate a connection with the source of power A—B only when the relay PWR is energized. The source of battery or D. C. power for the patron's machine is indicated by plus (+) signs placed at convenient points to prevent crossing of circuit lines.

With this preliminary explanation of the patron's machine, we can proceed with the control circuits of the equipment.

At the patron's end of the system, the transmission lines L1—L2 terminate in the secondary coil 218 of a transformer TX whose primary coil 220 is in the output circuit of the transmitting amplifier AMT. The plate voltage for this amplifier output circuit comes from a battery source B25, which may be the plus side of a rectifier in the amplifier unit. To the center of coil 218 is connected a wire 224 which branches out at point 225 and connects two selenium or like rectifiers 228 and 230. These rectifiers are arranged in opposition so that negative simplex current from the main office passes only through the rectifier 228 and positive current goes only through the rectifier 230. The plus side of rectifier 230 is connected to a line relay LR, which is therefore energized only by positive simplex potential.

When the send button 206 is pushed in, the rod 212 operates the associated switches with the following results:

The closed switch contact 240 completes the circuit of power relay PWR from bus bar A, wire 242 to point 243, through the closed switch contact 244, wire 245, closed contact 240, wire 246 to conductor 247, which goes to one side of relay PWR, and by wire 248 to bus bar B. The closed contact 216 of PWR turns the power on by connecting lead A with conductor A' which is now connected by the closed switch contact 249 to conductor 250. This energizes the drum rotating motor DRM, the chopper motor CHM, the exciter lamp 204, and both sections of the amplifier. However, only the transmitting section AMT is operatively connected in circuit by conductor 252 which goes to ground through the closed contact 253 of the switch assembly for the receive button 208 (not operated now).

Also, a slow-release relay TR is energized from the auxiliary main A' through the back contact 254 of a relay HR, wire 256, and through the closed contact 258 of line relay LR to power line B. The relay TR locks through its front contact 260. At this time neither of the relays HR and LR is energized.

The closed switch 262 of the operated send button 206 places a ground on the negative simplex circuit (imposed on the line at the main office). This grounding circuit goes from the center tap of transformer coil 218 through the rectifier 223, a resistor 263, conductor 264, through switch 262, conductor 265 to point 265' and through the closed grounded contact 266 of relay HR before the latter is energized. With the opening of contact 266 upon the delayed operation of relay HR (as presently explained), a second grounding path for the negative simplex circuit goes from point 265' over wire 266' through a normally closed switch 267, which is opened briefly once for each revolution of the drum by a cam disk or commutator 268 mounted on the drum shaft. This causes the simplex circuit to pulse synchronously with the speed of the drum. The line relay LR, however, remains continuously energized owing to the condenser 269 shunted across its coil.

It may be mentioned here that the grounding of the negative simplex circuit causes the line relay CLR in the main office equipment (Fig. 2) to be energized and the patron's call lamp 20 to be lighted.

The patron's relay HR is energized from the plate voltage terminal B26 of a rectifier in the recording amplifier AMR, and this circuit goes through the output tube 270. Therefore, the relay HR is not energized until the tube 270 is heated sufficiently to become conductive. The energized relay HR closes its contact 272 and this completes the circuit of the drum feed motor DFM from bus bar B through the closed contact 274 of energized relay LR, over wire 275 through relay contact 272, through the motor DFM, conductor A' and through the closed contact 216 of power relay PWR to the other bus bar A. The energizing of motor DFM starts the optical scanning of the patron's message.

Since optical scanning in facsimile machines is well understood, it will suffice to say that the light impulses caused by the scanned message are impressed on the sensitive electrode of the photocell 202 which translates them into corresponding electrical signals. As shown in Fig. 4, the photocell is connected to the grid 278 at the input end of a twin amplifier tube 280. The amplified signals go throuh transformer TX over the line L1—L2 to the main office recorder.

Let it be noted that when the patron's machine is set up as a transmitter, the stylus motor STM is kept out of circuit at the open switch contact 282 of the switch assembly controlled by the send button 206. Consequently, the recording stylus 205 remains in withdrawn position (indicated at 205') from the drum 200. In the recording section AMR of the amplifier, the output tube 270 operates to energize the relay HR but the input tube 285 is disconnected because the conductor 286 is open at the switch contact 287 of the receive button 208.

The patron's machine has a buzzer 290 which sounds when the main office has a message to send. As we have seen, positive battery applied to the line from the main office operates the patron's relay LR. Its closed contact 274 connects the buzzer 290 in circuit from the lead B through the closed contact 292 of relay PWR (not yet energized) and over wire 293 to the lead A.

In response to the buzzer, the patron mounts a recording blank on the drum and operates the receive button 208. This connects the power relay PWR to bus bars A—B through wire 242, closed switch contact 294, wire 245, closed switch contact 295, by wire 247 through the relay winding and by wire 248 to lead B. The energized relay PWR opens its contact 292 and stops the buzzer.

The operation of the receive button 208 disconnects the transmitting amplifier AMT by opening the circuit at switch contact 253, and at the same time the recording amplifier AMR is connected in circuit through wire 286 and the closed switch contact 287. When the relay HR operates and closes its contact 272, the circuit of the stylus motor STM is completed by way of conductor 293, switch contact 282 and the auxiliary main A'. The drum feed motor DFM is energized at the same time, so that the machine is ready to receive the facsimile signals impressed on the grid of the input recording tube 285. The stylus 205, which has been moved by motor STM into contact with the recording blank, receives the amplified signals and records them on the electrosensitive paper in a manner well known in this art.

When the patron's machine operates as a receiver, the relay TR remains unenergized. This is due to the fact that the energizing of the line relay LR by positive battery from the main office holds the contact 258 open, so that the circuit of relay TR is not completed even when the power relay PWR is energized by the patron's operation of the receive button 208.

The patron's machine has a slidable scanning carriage SK (Fig. 5) operated by the motor DFM to feed the drum along its shaft. After the drum starts feeding, this carriage actuates a switch 295 (Fig. 4) and this switch stays closed until the carriage returns to initial position after a scanning operation (whether transmitting or recording). During transmission, when the relay TR is energized and holds the contact 296 open, the closing of switch 295 is immaterial. However, when the patron's machine is set up for recording, the closed contact 296 of the unenergized relay TR sets up a circuit for the stylus motor STM and the drum feed motor DFM if the relay LR is released from the main office before the patron's drum 200 has reached the end of its axial movement. This will be made clear when we describe the operation of the system as a whole.

At the close of a transmission from the main office to the patron's machine, the removal of plus potential from the line L1—L2, as previously described, releases the patron's relay LR. This completes the circuit of a relay ACK in the patron's machine through the following connections: from power main B, through the closed contact 258 of relay LR, wire 256, closed contact 298 of energized relay HR, closed contact 300 of relay TR (not energized during a recording operation), conductor 301, closed switch contact 302, through the winding of relay ACK and the neon lamp 304 in parallel, through a closed switch 305 (called the acknowledge button), the closed contact 306 of a switch assembly RB (called the rerun button), then by wire 242 to the power line A. The energized relay ACK locks through its front contact 308 and conductor 309 which goes to B through relay contact 258.

The closed front contact 310 of relay ACK closes the circuit of buzzer 290 through a back contact 312 of a relay BR, which has so far not been energized. The other closed contact 314 of ACK places a ground on the negative simplex through resistor 263 to keep the relay TPU at the main office transmitter energized.

The sounding buzzer 290 and the lighted lamp 304 serve as an end-of-message signal to the patron. The drum of his machine will continue to operate until the scanning carriage reaches the end of its stroke and trips the receive button 208, whereby the machine stops. The tripping action of the scanning carriage is fully described in the pending application Ser. No. 224,926, and it will suffice to refer briefly to the schematic outline of the switch tripping connections in Fig. 5.

The scanning carriage SK, which feeds the drum 200 along its shaft, has a projection 320 arranged to strike an upright pin 322 extending from the box that contains the switch mechanism operated by the three buttons 206–208–210. When the pin 322 is moved to the left by the carriage SK at the end of its travel, a cam plate in the switch box releases any previously operated button and stops the machine. The patron can shut the machine down independently of the carriage movement by pressing the stop button 210.

If the patron's machine shuts down of its own accord (that is, by the movement of carriage SK to final position), the buzzer 290 will continue to sound until the patron presses the stop button 210. The operation of this button closes the switch contact 325 whereby the relay BR is energized for the first time from power line A—B, through the closed contact 310 of the energized relay ACK. The relay BR locks through its closed contact 326, and its opened contact 312 cuts out the buzzer 290, but the lamp 304 stays on.

The patron now has time to remove the message and read it leisurely without the annoying disturbance of the buzzer noise. If the message is satisfactory, he presses the acknowledge button 305, which releases the relay ACK and puts out the acknowledge lamp 304. The opened contact 310 of ACK releases the relay BR and the other opened contact 314 removes ground from the negative simplex, thus releasing the relay TPU at the main office transmitter.

Suppose now that the patron, after examining the recorded message, is not satisfied with it and he wants a better copy. In that case, instead of pressing the acknowledge button 305 as before, he puts a new blank on the drum and operates the rerun button RB. The grounded contact 328 connected to conductor 330 shunts out the resistor 263 from the negative simplex circuit at the main office. As a result, the increased flow of current through coil 101*a* of relay TRR (Fig. 1) will energize that relay and light the lamp 125. This tells the operator that the message was not received correctly and that the patron is recording another copy of it.

*When the patron presses the wrong button*

If a patron by mistake presses the wrong setting-up button, either to place a call to central for transmission or in answering a call from the main office for receiving, the control circuits of the system are so designed that the machine will not be connected and the buzzer 290 will sound as a warning signal.

Suppose the patron on getting a call from central to receive a message presses the send button 206 instead of the receive button 208. The line relay LR being energized by the call from central, its contact 258 is open and keeps the relay TR from operating. The closed contact 332 of TR places a shunt around the relay HR, this short circuit going through wire 334, contact 332, wire 335, and through the closed switch contact 336 of the receive button to ground. Therefore, the relay HR can not operate and the motors STM and DFM remain idle. At the same time, the circuit of buzzer 290 is completed from line A by wire 293, through the closed contact 338 of relay TR, wire 340, closed switch contact 342 of the operated send button 206, and by wire 344 to line B. The sound of the buzzer tells the patron that he has pushed the wrong button.

The relay HR is also shorted out when the patron, wishing to transmit a message to central, presses the receive button 208. The line relay LR not being energized at this time, the relay TR is energized from the lead A through the closed contact 216 of the energized relay PWR, the closed contact 254 of relay HR, wire 256, and through the closed contact 258 of relay LR to line B. This shorts out the relay HR through the closed contact 346 of TR, wire 348, and the closed grounded contact 350 of the operated receive button 208. This time the buzzer circuit goes by wire 293 through the closed contact 352 of the energized relay TR, wire 354, the closed switch contact 356 of the send button 206 (not operated), and by wire 334 to line B.

It will be seen, then, that pressing the wrong button (no matter whether 206 or 208) will prevent the patron's relay HR from operating, so that its contact 266 remains closed and shunts out the commutator switch 267. Consequently, no phasing pulses are sent to the main office and the relay TPU in the transmitter equipment (Fig. 1) or the relay RPU in the recorder equipment (Fig. 2) will not pulse. Therefore, nothing happens at the main office concentrator until the patron presses the right button.

*Operation of the system when patron sends to main office*

In the preceding portion of this specification we have described in detail the main office equipment and the transceiver equipment of our two-way system, and now we shall explain as concisely as possible the interaction and intercontrol between the two terminal equipments for the transmission of messages from each terminal to the other. First, let us assume that a patron desires to send a telegram to the main office from where it will be forwarded to its destination.

*At the transceiver.*—After placing the message sheet on the drum, the patron presses the send button 206, which remains locked in depressed position. This energizes the power relay PWR from bus bars A—B through the closed switch contact 240 and this relay stays energized during the entire transmission operation. The energized power relay closes the circuits of the drum motor DRM, the chopper motor CHM and the exciter lamp 204. The plate circuits of the transmitting amplifier AMT are completed through wire 252 and the grounded switch contact 253. The relay TR is energized through contact 254 of relay HR (not yet energized) and contact 258 of relay LR. At the same time a ground is placed on the negative simplex circuit (kept on the lines L1—L2 at the main office) through contact 266 of relay HR.

*At the main office* (*Fig. 2*).—The ground thus placed at the transmitter on the negative battery terminal 18 energizes the line relay CLR, thereby lighting the patron's call lamp 20. The operator, seeing the light, will plug a recorder into the patron's jack PJ and then press the start button 138. This closes the circuit from negative battery B15 through relay RPU, whose closed contact 142 causes relay RH to be energized from the negative battery terminal B16. The operation of relay RH shorts out the normally energized relay RM through contact 148, so that RM releases. The closed contact 145 of relay RH energizes the power relay RPR which closes the circuit of the stylus belt motor SM and the red busy lamp 147. However, the stylus belt 130 is not yet running and the paper feed motor PFM is not yet energized.

*At the transceiver.*—The relay HR being in the cathode circuit of the receiving tube 270 is energized when the tube is sufficiently heated and its opened contact 266 removes ground from the commutator switch 267 which now interrupts the simplex circuit briefly once for each revolution of the drum 200. Note that the drum feed motor DFM is not yet running, so that scanning has not started.

*At the main office.*—The interruptions of the negative simplex circuit cause the relay RPU to pulse in synchronism with the patron's rotating drum. The first interruption reaching RPU causes its opened contact 150 to break the short circuit of relay RPH, which now is energized from B18 and its closed contact 158 energizes the phase magnet PMR from B19. The operation of PMR reverses the simplex from negative to positive, thereby energizing relay RPU from B20, and this positive battery goes over the line L1—L2 to the transceiver. The positive potential remains on the line during the transmission period. The energizing of phase magnet PMR releases the stylus belt for operation by the motor SM, and the closed contact 160 of relay RPH starts the paper feed motor PFM. In other words, the main office recorder is ready for the patron's signals.

*At the transceiver.*—The positive simplex battery goes through the rectifier 230 and energizes the relay LR, which closes its contact 274 and energizes the drum feed motor DFM through the closed contact 272 of relay HR (now energized through tube 270). Scanning now starts at the transceiver.

*At the main office.*—The facsimile signals coming from the optical scanner in the patron's machine pass from the lines L1—L2 through the jack-and-plug connection into the rectifier inverter RV′ and through the transformer 140 into the stylus circuit which records the signals on the endless blank with which the recorder is supplied. As previously mentioned, during the transmission and recording period of the connected machines the relay RPU of the main office recorder keeps pulsing with the speed of the patron's transmitting drum.

*At the close of a transmission from the patron's machine*

From the time the central operator pushes the start button 138, it takes only about two seconds for the patron's machine to begin scanning, and it requires only one minute to transmit the message. When the patron's scanning carriage SK strikes the pin 322 and trips the operated send button 206 to normal position, the power relay PWR is released and takes the A—B power off the machine. However, the line relay LR remains energized in the positive simplex circuit from the main office.

*At the main office.*—When the patron's drum 200 stops, the interruptions of the simplex circuit cease because this circuit is now grounded through the contact 166 of the released relay HR. Consequently, the relay RPU in the main office recorder stops pulsing and remains in steady energized condition. The opening of contact 163 takes the negative bias off the tube VT′ which fires and causes relay REM to energize. The closed contact 166 lights the end-of-message lamp 168 and the other closed contact 170 shorts out the relay RPH, which now releases.

The release of relay RPH stops the paper feed motor PFM and releases the phase magnet PMR which stops the stylus belt (by causing a clutch to hold the belt shaft locked) and changes the line battery from positive to negative. Since the battery circuit now stands open at the stopped transceiver, the relay RPU is deenergized and releases the relay RM, which in turn releases the relay RPR to disconnect the A—B power from the machine, so that the stylus motor SM stops and the busy light 147 goes out.

The operator now pulls out a measured length of paper containing the recorded message, thus causing the contact 172 to open and release the relay REM, which extinguishes the lamp 168. If the received message is satisfactory (that is, clearly recorded), the operator uses the code device CD to send positive battery over the line which again energizes the patron's line relay LR and operates his buzzer 290 to give a prearranged dash-dot code signal. This tells the patron that his message has been properly received and now the operator at the main office unplugs the recorder.

*Transmission from main office to patron*

Let us now assume that the main office has a message to transmit to the patron's machine. The message is placed on the drum 30, Fig. 1, and the drum is inserted into the transmitter. This shorts out the energized relay TD and it releases, thereby operating the relay TPR which releases the half nut magnet HN and turns the power on for the drum motor DM, the chopper motor CM and the exciter lamp 38. The machine, however, is not yet scanning because the carriage 36 is not moving. The operator now inserts the transmitter plug TG into the patron's jack and then presses the start button SB, thereby applying plus potential to the line L1—L2 from battery B4 through the relay SR.

*At the transceiver.*—The plus potential operates the patron's line relay LR and its contact 274 closes the A—B power circuit through the buzzer 290. In response to the buzzer the patron mounts a recording blank on the drum and presses the receive button 208. This energizes the relay PWR which connects power to the machine, as before, so that the drum 200 starts to rotate immediately. The receiving amplifier AMR being energized, the tube 270 heats up in a few seconds and operates the relay HR, which closes the circuit of motors STM and DFM, at the same time removing ground from the commutator switch 267 and thereby interrupting the plus simplex circuit as the drum rotates. In other words, the patron's machine is ready to receive the facsimile signals.

*At the main office.*—The pulsing of the simplex circuit operates the relay TPU which follows those pulses. The operation of relay TPU results in the energizing of relay TH and the release of the normally energized relay TPH. When the relay TH pulses, it lights the busy lamp 87 and the release of TPH energizes the phase magnet PMT. Now, with the drum 30 starting to rotate and the carriage 36 feeding down, the scanning of the message begins and is recorded on the patron's machine.

*At the close of a transmission from the main office*

If the message to be transmitted is a short one, the operator punches a hole 31′ (Fig. 1) in the sheet right after the signature of the message. When the contactor 43′ touches the grounded metal of the drum through the punched hole, the normally energized relay TD is shorted out and releases. The same result is obtained if no hole is punched in the sheet and the carriage 36 moves all the way down to close the switch 43. The release of relay TD operates the end-of-message relay TEM which removes the plus battery B4 from the line and substitutes negative potential from B9.

*At the transceiver.*—The removal of plus potential from line L1 — L2 releases the relay LR and this causes the relay ACK and lamp 304 to be energized from the power mains A—B. Relay ACK closes the circuit of buzzer 290 and also places ground on the negative simplex through resistor 263. The sounding of the buzzer and the lighting of lamp 304 constitute an end-of-message signal to the patron, and the buzzer keeps sounding until the patron operates the stop button 210 which energizes the relay BR and opens the buzzer circuit. The machine stops when the scanning carriage SK at the end of its travel strikes the pin 322 of the interlocking switch assembly. If the received message is satisfactory, the patron presses the acknowledge button 305, thereby releasing the relays ACK and BR and extinguishing the lamp 304. The release of relay BR removes ground from the negative simplex circuit.

*At the main office.*—The opening of the negative simplex line releases relay TPU which in turn releases relay TH to complete a circuit for lamp 105 through the closed contact 108 of relay TH and the closed contact 110 of relay TEM (still energized). The lamp 105 goes on as a signal to the operator that the patron has received the message and found it satisfactory. The operator now removes the drum from the transmitter and unplugs the machine, which is thus restored to normal standby condition.

*At the transceiver.*—If the patron is not satisfied with the recorded message, he will not press the acknowledge button 305 but will instead operate the rerun button RB. The closed contact 328 shunts out the resistor 263 in a negative simplex circuit and thereby increases the current.

*At the main office.*—The increased current now passing through coil 101*a* of relay TRR from the negative battery terminal B9, will energize that relay and light the rerun lamp 125, which tells the operator that the message was not received correctly. Nothing else happens at the main office in response to the patron's operation of his rerun button. In response to the rerun signal, the operator may remove the drum from the machine and examine the message to see if it is a sufficiently clear copy. If not, a better copy is placed in the machine and retransmitted to the patron.

*How the line circuit is tested by the transmitter start button SB at the main office*

We have already described that when the operator at the main office presses the start button SB (Fig. 1) to transmit a message to the patron, positive potential is applied to the line from battery B4 through the sleeve pair of the jack and plug connection. Then, when the start button is released, the circuit of relay SR is opened; but this relay (being of the slow-release type) does not let go immediately, so that negative potential goes briefly to the line from battery B5.

Now, if at that moment the patron's machine has been turned on as a transmitter, the negative voltage will find a ground through the resistor 263 (Fig. 4), the closed switch contact 262 of the operated send button 206, wire 265, and the closed grounded contact 266 of relay LR (not energized at this moment). Therefore, full negative potential will not appear on the line and the tube 80 (Fig. 1) will not fire, so that the relay TS will not operate. As a result, the relay TPU will not be energized and the busy light 87 will not go on. This tells the operator that the patron has started his machine as a transmitter and she will plug in a recorder to receive his message.

This automatic line testing provision for determining the condition of the patron's machine at the moment of closing the transmitter start button SB at the main office is a feature of the facsimile system described and claimed in the pending application of Ridings and others, Ser. No. 147,372, filed March 3, 1950. We do not, therefore, claim this particular feature as a part of the present invention, and we have described it here merely because it has been included in the system of the present case.

*The acknowledge signal circuits of Figs. 6 and 7*

We have described how the main office operator, after receiving a message from a patron and finding it satisfactory, acknowledges that fact to the patron by sending a special signal over the line L1—L2 to operate the patron's buzzer 290. In Fig. 2 this special signal is generated by the code device CD which sends out a combination of dots and dashes. Other ways of providing the system with a special acknowledge signal from the main office to the patron are shown in Figs. 6 and 7, where we have included only so much of the system as is needed to explain the operation of the signal circuits.

In the recorder equipment at the main office there is a slow-release relay 400 whose tongue contact 402 connects with a suitable source of frequency SF (such as 60 or 180 cycles per second) when the relay is energized. A button 403 connects the relay 400 with a source of battery potential 404. The relay tongue 402 is connected to the normally closed back contact 176 of relay RH which, as previously explained, is energized during a transmission period. When the acknowledge button 403 is held down for a second after a transmission has been completed, the frequency source SF is connected to the center tap 17 of the line transformer 16 through the plug and jack connection indicated schematically at 405.

This signal frequency goes over the line L1—L2 and is tapped off the coil 218 by conductor 224 into a transformer 406 which is tuned by a condenser 408 to the signal frequency. A condenser 410 blocks direct current and prevents the line relay LR from being affected by the signal pulses.

A cold cathode tube 412 has its firing electrode 413 connected to one side of the secondary coil of transformer 406 through a positive rectifier 414. The plate or positive electrode 415 of tube 412 is connected through a rectifier 416 to one side of a circuit which includes various devices in the patron's machine adapted to be energized when the power relay PWR is operated, as previously described in Figs. 3 and 4. The devices, such as the drum motor DRM, the chopper motor CHM, the exciter lamp 204, and the amplifiers, are represented collectively in Fig. 6 by the rectangle 420. It will be understood, then, that when the relay PWR is energized, its closed contact 216 connects the power main A with conductor A′, as in Fig. 4, and energizes the devices 420.

The cathode or negative electrode 422 of tube 412 is connected to the power main A, with a condenser 424 connected across the electrodes 415 and 422 to steady the alternating current through the tube and prevent the latter from flickering. Another condenser 425 is connected between the firing electrode 413 and the rectifier 414 to delay the starting action of the signal frequency, so that the tube will not fire with the first voltage shock. In other words, the condenser 425 gives the signal voltage time to build up and thereby prevents a momentary voltage surge picked up by the line from lighting the tube.

As long as the power relay PWR in the patron's machine is energized, that is, during a transmission cycle initiated either by him or at the main office, the closed contact 216 shorts out the signal tube 412. At the main office the signal frequency circuit is held open by contact 176 of relay RH which remains in energized condition during a transmission period. It is therefore apparent that when the operator presses the acknowledge button 403, the patron's signal lamp 412 will go on only if the relay RH (at the main office transmitter) and the relay PWR (in the patron's machine) are in released condition.

The circuit of tube 412, once it has fired, goes on from the power mains A—B through the devices 420, but the current through this tube circuit is so small that it will not energize any one of those devices. The operator need hold the button 403 down only for a second, for that is sufficient for the tube 412 to fire, and once started the tube stays lighted until the power relay PWR is again energized and shorts it out. Thus, the continued illumination of tube 412 is visual evidence to the patron that the last message he transmitted was received at the main office and found satisfactory. The patron can extinguish the lamp 412 by turning the power on for a moment.

In Fig. 7 the patron's end of the acknowledge signal circuit is modified by the substitution of a tuned vibrator coil 430 for the tuned transformer 406 in Fig. 6. This vibrator responds only to the signal frequency SF and the vibrator reed 432, owing to its inertia, closes the contact 434 with a delayed action corresponding to that of the condenser 425 in Fig. 6. Otherwise, what we said for Fig. 6 applies fully to Fig. 7 without the need of repetition.

Although we have described a particular system as a practical embodiment of our invention, the novel features embraced in this system are not limited to the details herein shown and described by way of example, for changes and modifications are possible within the scope of the appended claims. In this description of the drawings and in certain claims we apply the convenient term "button" to the different hand operated switches, but we want it understood that we broadly include thereby any practical form or kind of switch adapted to be operated by hand.

The facsimile system of this invention was designed to embody certain desirable features not contained in the system of the aforesaid pending application Ser. No. 147,372 from which the present system distinguishes in several important respects. Such features as are common to the two systems belong to that earlier application and are not claimed herein.

We claim as our invention:

1. In a facsimile telegraph system, a transmitter provided with continuously operable scanning mechanism, apparatus for controlling the operation of said mechanism, said apparatus including a vacuum tube which is held inactive during the operation of said mechanism, a receiver provided with a recording mechanism which includes a rotary drum, means for connecting the two machines for facsimile transmission, switch means, means to periodically operate said switch means in synchronization with said drum to transmit periodic pulses to said transmitter and means for automatically energizing said tube to stop the transmitter scanning mechanism in response to the stopping of said periodic pulses.

2. In a facsimile telegraph system, a transmitter provided with continuously operable scanning mechanism, apparatus for controlling the operation of said mechanism, said apparatus including a relay and a timed device for closing the circuit of said relay when said device is energized, means controlled by the energizing of said relay to stop the transmitter scanning mechanism, a receiver provided with recording mechanism which includes a rotary drum, means for connecting the two machines for facsimile transmission, switch means, means to periodically operate said switch means in synchronization with said drum to transmit periodic pulses to said transmitter and means for automatically energizing said device in response to the stopping of the recording drum to stop said transmitter scanning mechanism.

3. In a two-way facsimile telegraph system between a main office and an out-station, a transmitter and a receiver at the main office, a transceiver at the out-station provided with transmitting equipment and recording equipment, said transceiver having a send switch for setting the machine up as a transmitter and a receive switch for setting it up as a recorder, connections between said switches for automatically locking either switch in operated position and releasing the other switch, so that only one switch can be in setting-up position at a time, means controlled by the operated receive switch for connecting the main office transmitter with the recording equipment of said transceiver, means controlled by the operated send switch for connecting the transmitting equipment of the transceiver with the main office receiver, a warning signal at the transceiver, and means for automatically energizing said signal when the wrong switch is operated in setting up the transceiver.

4. In a two-way facsimile telegraph system between a main office and an out-station, a transmitter and a recorder at the main office, a transceiver at the out-station equipped to operate as a transmitter and as a recorder, a send button and a receive button on said transceiver, switching means controlled by the send button and other switching means controlled by the receive button for placing the transceiver in condition for either operation, connections between said buttons for automatically locking either button in operated position and releasing the other button, so that only one button can be in setting-up position at a time, mechanism at the main office transmitter for placing the same in facsimile communication with the transceiver in response to the operation of said receive button, other mechanism at the main office recorder for operatively connecting the same with the transceiver in response to the operation of the send button, and circuit connections controlled by the operation of the wrong setting-up button for preventing either of said mechanisms at the main office from connecting with the transceiver.

5. In a two-way facsimile telegraph system between a main office and an out-station, a transmitter and a recorder at the main office, a transceiver at the out-station provided with transmitting equipment and recording equipment, said transceiver having a send switch for setting the machine up as a transmitter and a receive switch for setting it up as a recorder, connections between said switches for automatically locking either switch in operated position and releasing the other switch, so that only one switch can be in setting-up position at a time, a relay at the transceiver, means for energizing said relay when either switch is operated to turn the power on for the transceiver, a second relay at the transceiver, means responsive to the operation of the first relay for energizing the second relay after a certain delay, a pulse relay at the main office transmitter and a pulse relay at the main office recorder, circuits for causing either one of said main office relays to pulse in response to the energizing of the second transceiver relay, means at the transceiver for preventing the energizing of the second transceiver relay when the wrong switch is operated in setting up the transceiver, means whereby the unenergized condition of the second transceiver relay prevents either one of said main office relays from pulsing, and means at the main office requiring the pulsing of said pulse relays for placing the transceiver in operative communication with either machine at the main office.

6. In a two-way facsimile telegraph system between a main office and an out-station, a transmitter and a recorder at the main office, a transceiver at the out-station equipped to operate as a transmitter and as a recorder, switching means for setting up the transceiver for either operation, means for connecting the main office transmitter with said transceiver when the latter is set up as a recorder, means for connecting the transceiver when set up as a transmitter with the main office recorder, an acknowledge button at the main office recorder, an acknowledge signal at the transceiver, a relay controlled circuit energized by the operation of said button after the close of a transmission from the transceiver to operate said transceiver acknowledge signal, an acknowledge button at the transceiver, an acknowledge signal at the main office transmitter, and relay controlled circuits energized by the operation of said transceiver button after the close of a transmission from the main office to operate said main office signal.

7. In a two-way facsimile telegraph system between a main office and an out-station, a transmitter and a recorder at the main office, a transceiver at the out-station provided with transmitting apparatus and recording apparatus, a local source of power for the transceiver, a send switch and a receive switch in said transceiver, connections between said switches for automatically locking either switch in operated position and releasing the other switch, so that only one switch can be in operated position at a time, means whereby the operation of the send switch energizes the transmitting apparatus, means whereby the operation of the receive switch energizes the recording apparatus, signalling circuits between the main office and the transmitter, relay controlled circuits for connecting the main office transmitter with the recording apparatus of the transceiver when the receive switch is operated in response to a signal from the main office, other relay controlled circuits for connecting the transmitting apparatus of the transceiver with the main office recorder in response to a signal appearing at the main office when the transceiver send switch is operated, and a stop switch at the transceiver for releasing either of said switches and disconnecting the power.

References Cited in the file of this patent

UNITED STATES PATENTS

| | | |
|---|---|---|
| 2,293,704 | Blanton | Aug. 25, 1942 |
| 2,356,116 | Ridings | Aug. 15, 1944 |
| 2,365,741 | Wise et al. | Dec. 26, 1944 |
| 2,374,704 | Ridings et al. | May 1, 1945 |
| 2,474,257 | Kleinschmidt | June 28, 1949 |
| 2,524,651 | Cooley | Oct. 3, 1950 |
| 2,567,307 | Wise et al. | Sept. 11, 1951 |